United States Patent
Morishita

(10) Patent No.: US 11,489,401 B2
(45) Date of Patent: Nov. 1, 2022

(54) ROTATING ELECTRIC MACHINE FOR VEHICLE

(71) Applicant: DENSO CORPORATION, Kariya (JP)

(72) Inventor: Kazuki Morishita, Kariya (JP)

(73) Assignee: DENSO CORPORATION, Kariya (JP)

( * ) Notice: Subject to any disclaimer, the term of this patent is extended or adjusted under 35 U.S.C. 154(b) by 239 days.

(21) Appl. No.: 16/862,671

(22) Filed: Apr. 30, 2020

(65) Prior Publication Data

US 2020/0259392 A1 Aug. 13, 2020

Related U.S. Application Data

(63) Continuation of application No. PCT/JP2018/039516, filed on Oct. 24, 2018.

(30) Foreign Application Priority Data

Oct. 31, 2017 (JP) .............................. JP2017-210292

(51) Int. Cl.
*H02K 5/22* (2006.01)
*H02K 5/10* (2006.01)
(Continued)

(52) U.S. Cl.
CPC ............... *H02K 5/225* (2013.01); *H02K 5/10* (2013.01); *H02K 5/22* (2013.01); *H02K 11/05* (2016.01); *H02K 11/33* (2016.01); *B60R 16/033* (2013.01)

(58) Field of Classification Search
CPC .......... H02K 5/10; H02K 11/33; H02K 11/05; H02K 11/046; H02K 5/225;
(Continued)

(56) References Cited

U.S. PATENT DOCUMENTS 6,664,675 B2 * 12/2003 Kaizu ..................... H02K 11/40
310/71
2001/0054853 A1 * 12/2001 Hayashi ................. H02K 5/225
310/71
(Continued)

FOREIGN PATENT DOCUMENTS

JP  H01-103135 A  4/1989
JP  H07-111755 A  4/1995

OTHER PUBLICATIONS

Jan. 22, 2019 Search Report issued in International Patent Application No. PCT/JP2018/039516.

*Primary Examiner* — Alexander A Singh
(74) *Attorney, Agent, or Firm* — Oliff PLC

(57) ABSTRACT

A rotating electric machine for a vehicle includes a rectifier constituting a rectification circuit which rectifies the alternating current generated in the stator; a battery terminal protruding from the rectifier and configured to be connected with a battery cable; an insulating member having a through hole in which the battery terminal is inserted; and a waterproof cap attached to the insulating member so as to cover a connection part of the battery terminal with the battery cable in a waterproof state. One of an inner peripheral surface of the through hole of the insulating member and an outer peripheral surface of the battery terminal has a conical tapered face. The insulating member and the battery terminal are pressed against each other at the tapered face.

5 Claims, 8 Drawing Sheets

(51) Int. Cl.
*H02K 11/05* (2016.01)
*H02K 11/33* (2016.01)
*B60R 16/033* (2006.01)

(58) Field of Classification Search
CPC ...... H02K 2213/03; H02K 5/22; H02K 7/006; H02K 5/00; H02K 5/12; H02K 5/08; H02K 5/02; H02K 5/15; H02K 11/042; H02K 11/04; H02K 11/048; H02K 11/049; B60R 16/033
USPC ................................ 310/71, 68 d, 68 b, 68 r
See application file for complete search history.

(56) References Cited

U.S. PATENT DOCUMENTS

| | | | |
|---|---|---|---|
| 2006/0267424 A1* | 11/2006 | Imai | H02K 5/225 310/71 |
| 2006/0273671 A1* | 12/2006 | Oohashi | H02K 11/046 310/71 |
| 2008/0079324 A1 | 4/2008 | Aoshima | |
| 2011/0012451 A1 | 1/2011 | Bitzer | |
| 2016/0226328 A1 | 8/2016 | Chisaka et al. | |
| 2017/0054342 A1* | 2/2017 | Guntermann | H02K 5/225 |
| 2018/0006536 A1* | 1/2018 | Akamatsu | H02K 9/06 |

* cited by examiner

ROTATING ELECTRIC MACHINE FOR VEHICLE

CROSS-REFERENCE TO RELATED APPLICATION

This application is the U.S. bypass application of International Application No. PCT/JP2018/039516 filed Oct. 24, 2018 which designated the U.S. and claims priority to Japanese Patent Application No. 2017-210292, filed Oct. 31, 2017, the contents of both of which are incorporated herein by reference.

TECHNICAL FIELD

The present disclosure relates to a rotating electric machine for a vehicle.

BACKGROUND

A conventional rotating electric machine for a vehicle is provided with a rectifier for converting alternating current generated in a stator into direct current, and a wire harness is connected to an output terminal attached to the rectifier. For example, in the configuration of JP 2006-340516 A, a molded member obtained by insert-molding a sleeve is fitted around the outer periphery of the output terminal. Then, the molded member and the output terminal are inserted into a hole provided in the housing for protecting the rectifier, so that the output terminal and the connection terminal on the wire harness side can be connected.

SUMMARY

In the first aspect, a rotating electric machine for a vehicle includes a rotor fixed to a rotation shaft; a stator for generating an alternating current as the rotor rotates; a frame member for holding the rotor and the stator; a rectifier fixed to an outer side of the frame member and constituting a rectification circuit which rectifies the alternating current generated in the stator; a battery terminal protruding from the rectifier and configured to be connected with a battery cable; an insulating member having a through hole in which the battery terminal is inserted; and a waterproof cap attached to the insulating member so as to cover a connection part of the battery terminal with the battery cable in a waterproof state, wherein one of an inner peripheral surface of the through hole of the insulating member and an outer peripheral surface of the battery terminal has a conical tapered face, and the insulating member and the battery terminal are pressed against each other at the tapered face.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
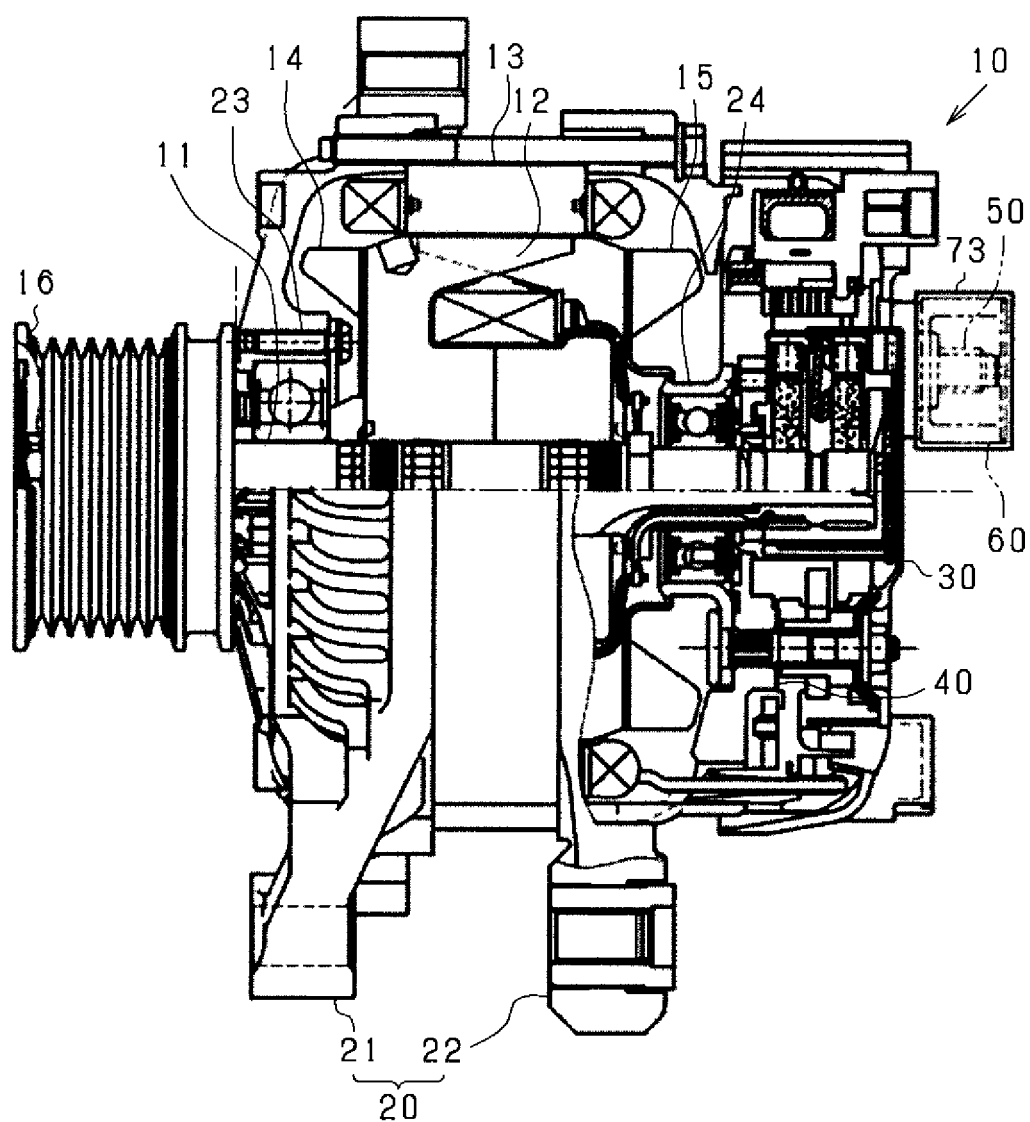
FIG. 1 is an axial sectional view of a rotating electric machine for a vehicle.

The output terminal is exposed to the outside of the cover member through the hole provided in the cover member. In order to waterproof the connection part between the output terminal and the connection terminal on the wire harness side, a waterproof cap for covering the connection part may be attached. On the other hand, holes for heat dissipation and the like are provided in the housing, and when water intrudes into the engine compartment due to, for example, water splashing from the road surface, some water also intrudes inside the housing of the vehicular rotating electric machine. If the water that has entered the housing intrudes inside the waterproof cap through a gap between the output terminal and the cover member provided around it, the connection part between the output terminal and the connection terminal may corrode.

The present disclosure has been devised in view of the above problem, and a main object thereof is to provide a rotating electric machine for a vehicle that can prevent entry of water into a connection portion between an output terminal and an external terminal.

In the first aspect, a rotating electric machine for a vehicle includes a rotor fixed to a rotation shaft; a stator for generating an alternating current as the rotor rotates; a frame member for holding the rotor and the stator; a rectifier fixed to an outer side of the frame member and constituting a rectification circuit which rectifies the alternating current generated in the stator; a battery terminal protruding from the rectifier and configured to be connected with a battery cable; an insulating member having a through hole in which the battery terminal is inserted; and a waterproof cap attached to the insulating member so as to cover a connection part of the battery terminal with the battery cable in a waterproof state, wherein one of an inner peripheral surface of the through hole of the insulating member and an outer peripheral surface of the battery terminal has a conical tapered face, and the insulating member and the battery terminal are pressed against each other at the tapered face.

Since the insulating member and the battery terminal are pressed against each other at the conical tapered face formed on one of the inner peripheral surface of the through hole of the insulating member and the outer peripheral surface of the battery terminal, the tapered face forms a seal part. In this case, it is possible to prevent water from intruding inside the waterproof cap through the space among the inner peripheral surface of the through hole of the insulating member and the outer peripheral surface of the battery terminal.

In addition, according to the above-described tapered structure, assembling the insulating member to the battery terminal results in the insulating part and the battery terminal being pressed against each other. This makes it possible to easily achieve appropriate waterproof performance for the battery terminal.

In the second aspect, the tapered face is formed on, among the inner peripheral surface of the through hole and the outer peripheral surface of the battery terminal, the outer peripheral surface of the battery terminal, and an outer diameter of a largest part of the tapered face of the battery terminal is larger than an inner diameter of the through hole.

In this configuration, since the outer diameter of the largest part of the tapered face of the battery terminal is larger than the inner diameter of the through hole, when the battery terminal is inserted into the through hole of the insulating member, a seal part can be suitably provided by the pressure contact between the tapered face of the battery terminal and the inner peripheral surface of the through hole. Further, since a gap is formed between the section of the outer peripheral surface of the battery terminal with a diameter reduced due to the tapered face, and the inner peripheral surface of the through hole, water can be collected in the gap and thus intrusion of water into the waterproof cap can be prevented.

In the third aspect, the insulating member includes a rear cover which covers the rectifier and has a through hole into which the battery terminal is inserted, and a protection member assembled to the through hole of the rear cover and provided with the through hole, and the protection member is provided with a held part held in the through hole of the rear cover.

In the case where the rear cover and the protection member are separate components, a gap tends to be generated among the inner peripheral surface of the through hole and the outer peripheral surface of the battery terminal due to assembly tolerance. Therefore, it is suitable to employ the present configuration in which a tapered face is provided to prevent intrusion of water. In addition, even if the held part is pressed against the tapered face of the battery terminal and tries to spread, the held part would be restricted by the inner peripheral surface of the through hole, whereby the seal part is secured.

In the fourth aspect, the battery terminal includes a rod-like part which is inserted through the rectifier and around which a cable terminal of the battery cable can be placed, and a cylindrical part in close contact with an outer peripheral surface of the rod-like part, in which the cylindrical part fixes the rod-like part to the rectifier and is contactable to the cable terminal, and the tapered face is provided over an entire length of a face of the cylindrical part that faces the through hole.

The cylindrical part has a fastening face with the cable terminal, and is a separate member from the rod-like part for fixing the rod-like part to the rectifier. Forming a tapered face on this separate member makes the shaping during manufacturing easier. In addition, since the tapered face is provided over the entire length of the face of the cylindrical part that faces the through hole, a large gap is formed between the tapered face and the inner peripheral surface of the through hole. Therefore, even if water enters from the space between the tapered face and the inner peripheral surface of the through hole, the water would likely be contained inside the through hole, and the water would not reach the connection part.

In the fifth aspect, the battery terminal includes a rod-like part which is inserted through the rectifier and around which a cable terminal of the battery cable can be placed, and a cylindrical part in close contact with an outer peripheral surface of the rod-like part, the cylindrical part fixes the rod-like part to the rectifier and is contactable to the cable terminal, and the tapered face is provided over a part of a face of the cylindrical part that faces the through hole.

The cylindrical part has a fastening face with the cable terminal, and it is a separate member from the rod-like part for fixing the rod-like part to the rectifier. Forming a tapered face on this separate member makes the formation easier. Further, since the tapered face is provided over a part of the face that faces the through hole, as compared with the case where it is provided over the entire length, if the diameter on the base side is the same, the diameter of the cylindrical part does not need to be reduced on the battery cable side, and thus the contact area with the battery cable can be increased.

In the sixth aspect, the tapered face is formed on, among the inner peripheral surface of the through hole and the outer peripheral surface of the battery terminal, the inner peripheral surface of the through hole, and an inner diameter of a smallest part of the tapered face on the inner peripheral surface of the through hole is smaller than an outer diameter of the battery terminal.

In this configuration, since the inner diameter of the smallest part of the tapered face on the inner peripheral surface of the through hole is smaller than the outer diameter of the battery terminal, a seal part can be advantageously formed by pressure contact between the part of the inner peripheral surface of the through hole with the minimum inner diameter and the outer peripheral surface of the battery terminal. In addition, providing the tapered face on the inner peripheral surface of the through hole of the insulating member formed of, for example, a synthetic resin is easier than forming the tapered face on the battery terminal side formed of, for example, metal.

In the seventh aspect, the tapered face is provided over an entire length of the through hole in an axial direction, and an annular protruding part protruding inward is formed on the tapered face of the through hole, the protruding part being located closer to the rectifier than the smallest part is, and the protruding part becomes elastically deformed in response to the protruding part contacting with the outer peripheral surface of the battery terminal.

The sealing among the inner peripheral surface of the through hole and the battery terminal secured at at least two locations, that is, at the tapered face and the protruding part further suppresses intrusion of water into the waterproof cap.

In the eighth aspect, the smallest part of the tapered face and the protruding part are provided with a separation therebetween in the axial direction.

Since the smallest part of the tapered face and the protruding part are located with a separation therebetween, water that has intruded from the gap between the protruding part and the outer peripheral surface of the battery terminal can be kept in the space between the smallest part of the tapered face and the protruding part, thereby preventing intrusion of water to the connection part side.

In the ninth aspect, the insulating member is formed of a material including an elastomer.

Since the insulating member is formed of a material containing an elastomer, it can be elastically deformed more easily when the inner peripheral surface of the through hole is pressed against the outer peripheral surface of the battery terminal.

First Embodiment

A configuration embodying the □rotating electric machine for a vehicle□as an AC rotating electric machine 10 will be described below based on the drawings. The same or equivalent parts in the embodiments described below are assigned with the same reference number in the drawings, and an earlier explanation should be referred to regarding those parts having the same reference number as another.

FIG. 1 is an axial sectional view of a rotating electric machine 10. In FIG. 1, the rotating electric machine 10 is a so-called alternator which is linked to the output shaft of a vehicle engine (not shown) via a connection member such as a belt. The rotating electric machine 10 includes a Lundell rotor 12 fixed to a rotation shaft 11, a stator 13 provided so as to surround the rotor 12, and a metal frame 20 (corresponding to the □frame member□) holding the rotor 12 and the stator 13. The frame 20 includes a front frame 21 and a rear frame 22 which are arranged in the axial direction of the rotation shaft 11, and these frames 21 and 22 are united via fastening provided by through bolts. In addition, each of the frames 21 and 22 is provided with hole(s) for heat dissipation, which allows water to intrude inside the frame 20.

Further, as is well known, the rotor 12 includes a field coil and a pair of pole cores. Centrifugal cooling fans 14 and 15 are attached at the axial end faces of the rotation shaft 11 of the pole cores. The frame 20 is provided with bearings 23 and 24, and the rotation shaft 11 and the rotor 12 are rotatably supported by the bearings 23 and 24. A pulley 16 is attached at one end (the end on the front frame 21 side) of the rotation shaft 11, and the pulley 16 is rotationally driven by the vehicle engine. The rotation of the pulley 16 causes the rotor 12 to rotate, and the cooling fans 14 and 15 also rotate together with this rotation, so that air enters and exits from the heat dissipation holes of the frame 20. On the other hand, the stator 13 includes a stator core having an annular shape, and a stator winding wound around the stator core. The stator 13 is fixed in such a state that it is held between the front frame 21 and the rear frame 22.

A rear cover 30 formed of synthetic resin is attached on the outer side of the rear frame 22 in the axial direction of the rotation shaft 11, and a rectifier 40 serving as a rectifier for rectifying alternating current generated in the rotating electric machine 10 is accommodated in the space formed between the rear frame 22 and the rear cover 30. The space between the rear frame 22 and the rear cover 30 contains, in addition to the rectifier 40, a regulator and a field coil energization mechanism (not shown).

Figure 2:
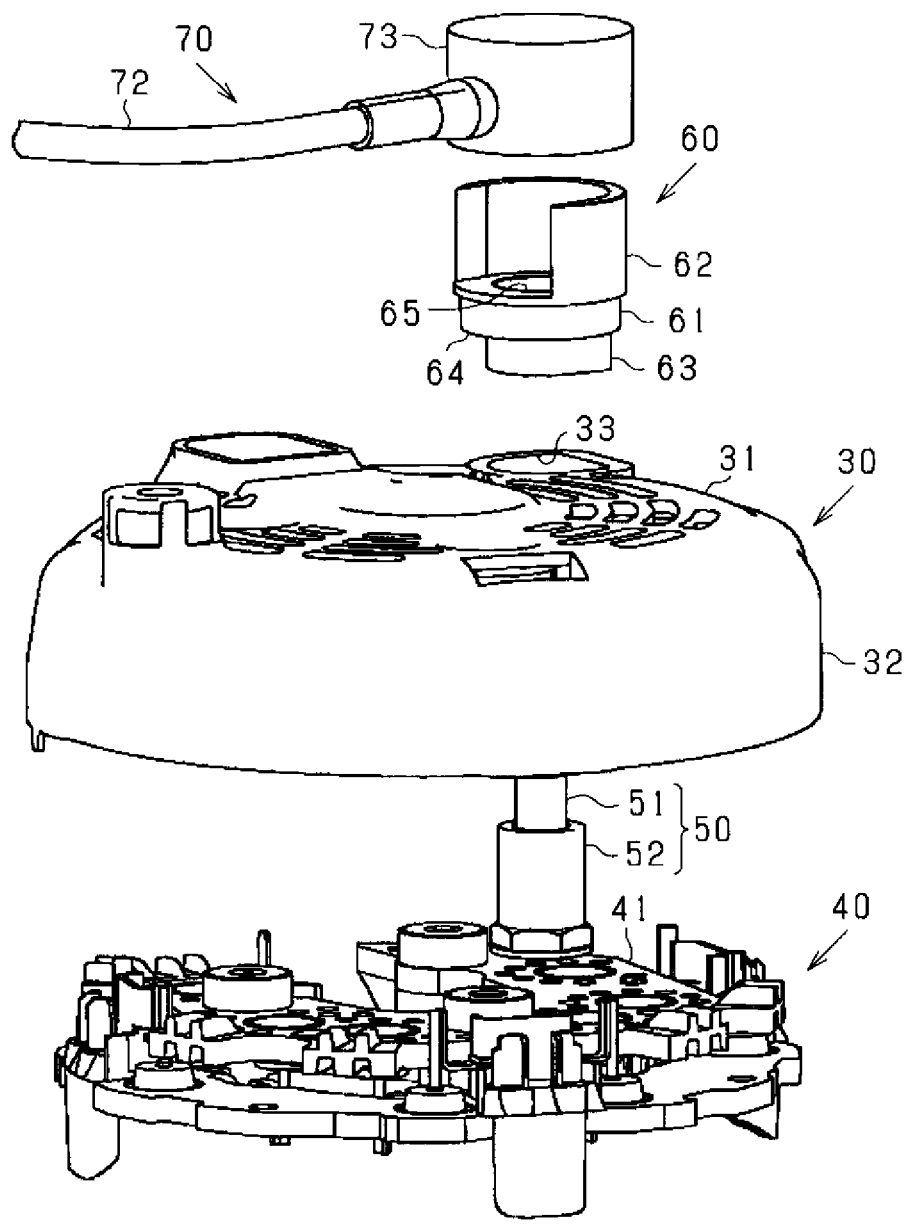
FIG. 2 is a disassembled perspective view of a battery harness to which a rectifier, a rear cover, a protection member, and a waterproof cap are attached.

FIG. 2 is a disassembled perspective view of the rear cover 30 and the rectifier 40. Note that, in the present embodiment, the adopted rotating electric machine 10 is one having a three-phase dual stator winding, and the number of phases of the stator winding is six. Therefore, the rectifier circuit forms a diode bridge circuit comprising a total of six parallel units corresponding to the six-phase current. However, alternatively, the rotating electric machine 10 may have a three-phase alternating current configuration.

The rectifier 40 includes a positive electrode side member 41 provided on the axially (that is, in the axial direction of the rotation shaft 11) outer side of the rear frame 22, and a negative electrode side member not shown. A rectifying element such as a diode is provided in the positive electrode side member 41, so that the rectifier 40 includes a rectifying circuit for rectifying alternating current.

Figure 4:
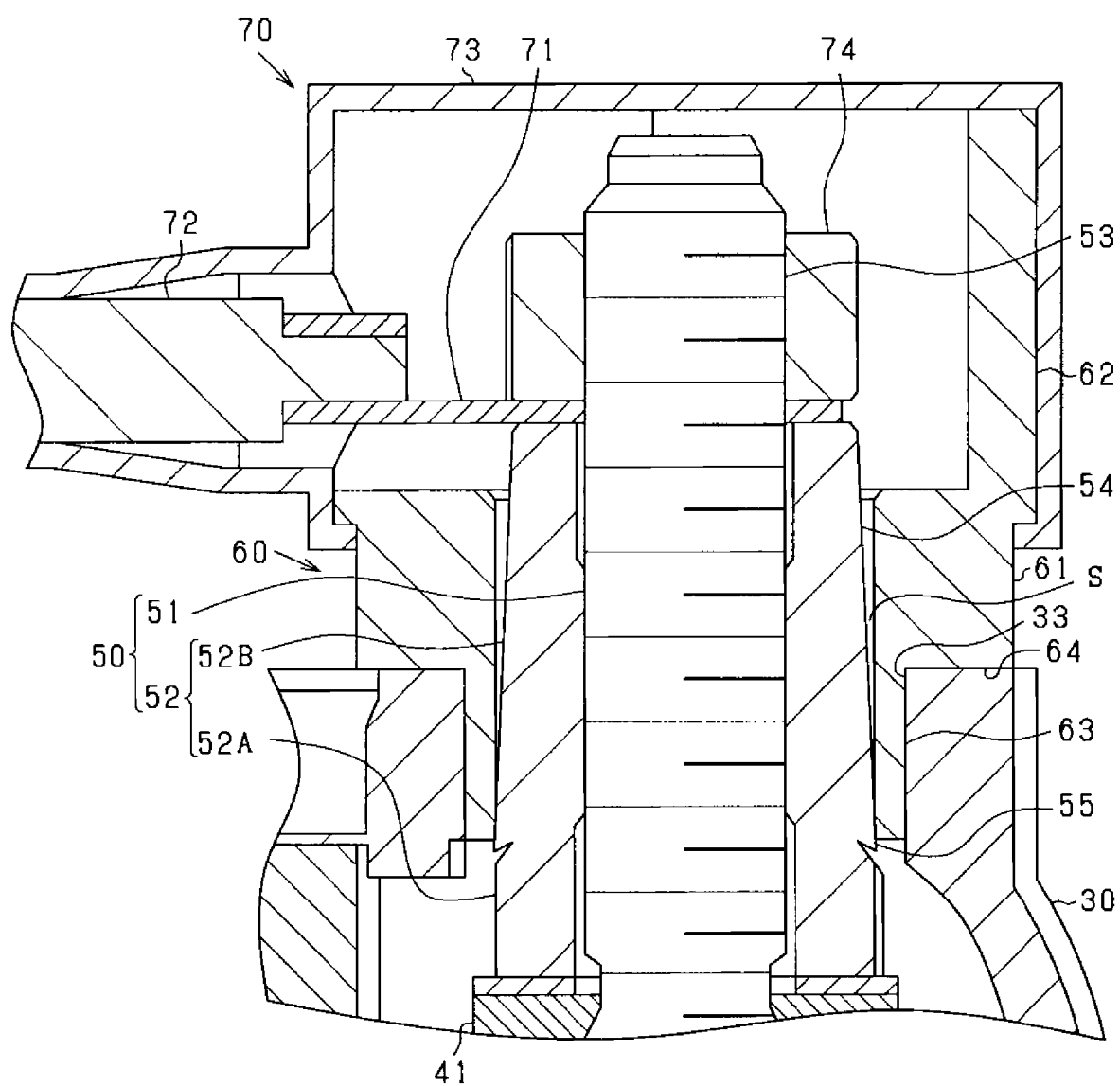
FIG. 4 is a sectional view after attaching the protection member according to the first embodiment.

As shown in FIG. 2, a battery terminal 50 protruding from the positive electrode side member 41 is provided as a terminal for externally outputting the current rectified by the rectifier 40, and as shown in FIG. 4, a battery cable 70 is connected to the battery terminal 50. The battery terminal 50 includes a stud bolt 51 which is a rod-like part, and a pedestal nut 52 which is a cylindrical part in close contact with the outer peripheral surface of the stud bolt 51. The outer peripheral surface of the stud bolt 51 is provided with a thread groove. The tip of the stud bolt 51 (the part protruding from the pedestal nut 52) forms a connection part 53 with the battery cable 70 (see FIG. 4). The pedestal nut 52 and its peripheral (surrounding) structure will be described later.

The battery terminal 50 is fixed by pressing the stud bolt 51 into a fixing hole provided at a certain position of the positive electrode side member 41 from the rear frame 22 side, and tightening the pedestal nut 52 from the rear cover 30 side. The stud bolt 51 is fixed so that its axial direction is parallel to the axial direction of the rotation shaft 11. Note that the stud bolt 51 may be fixed so that its axial direction is perpendicular to the axial direction of the rotation shaft 11.

As shown in FIG. 2, the rear cover 30 is a member provided on the axially (that is, in the axial direction of the rotation shaft 11) outer side of the rear frame 22 so as to cover the rectifier 40, and has a top plate 31 and a peripheral wall 32 extending from the periphery thereof. The rear cover 30 is preferably made of an insulating synthetic resin. The rear cover 30 is fixed with respect to the rear frame 22 by fastening provided by a plurality of fixing members at the top plate 31. The top plate 31 is provided with a plurality of air holes for releasing the heat of the rectifier 40. These air holes allow water to enter the space between the rear cover 30 and the rear frame 22. A peripheral wall 32 is provided extending in the axial direction of the rotation shaft 11. The top plate 31 of the rear cover 30 is provided with a through hole 33 through which the battery terminal 50 can be inserted so that the connection part 53 of the stud bolt 51 can be exposed.

Figure 3:
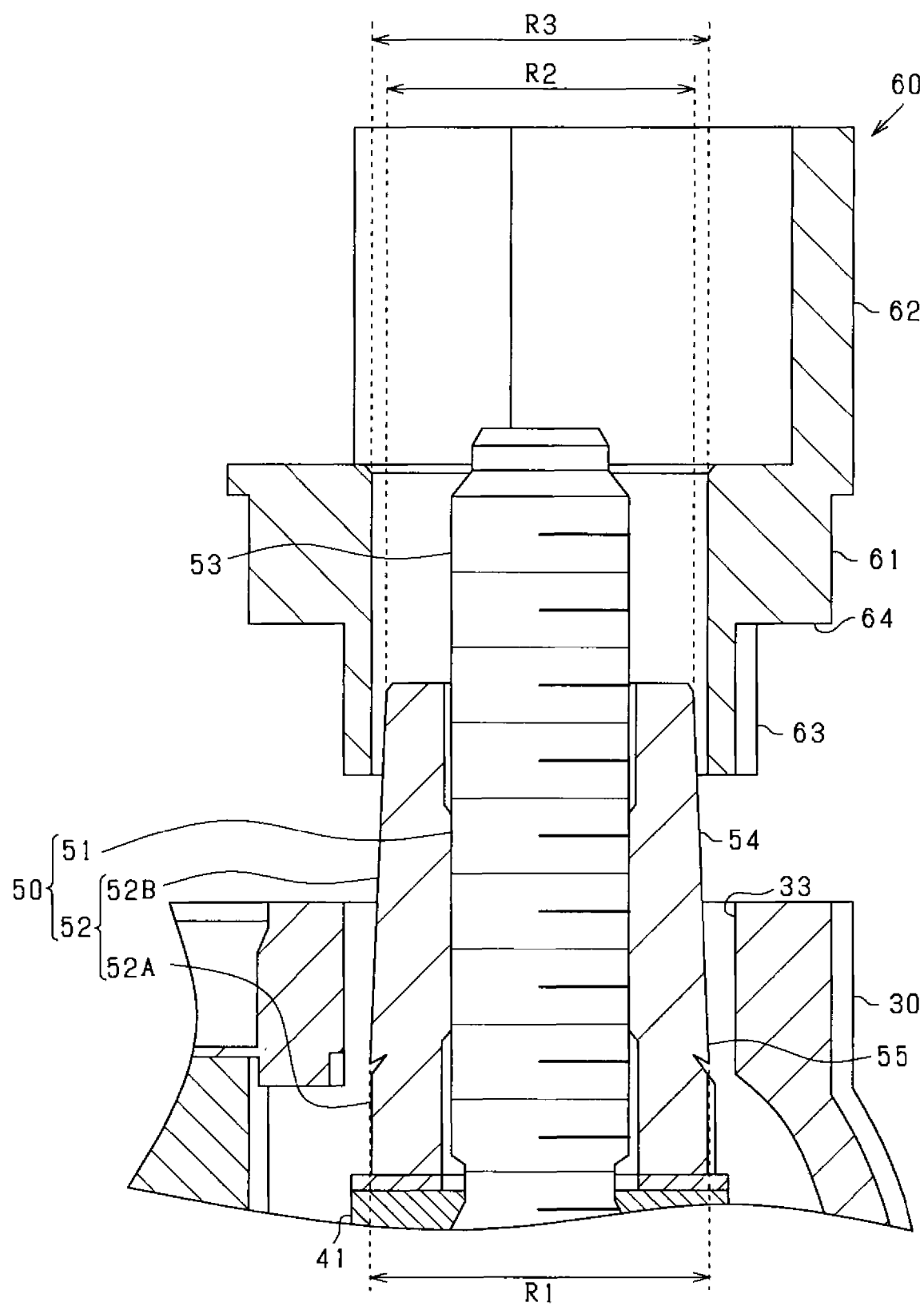
FIG. 3 is a sectional view during attachment of the protection member according to a first embodiment.

As shown in FIG. 4, a protection member 60 is attached to the through hole 33 of the rear cover 30. The protection member 60 is formed of, for example, a synthetic resin containing an elastomer, and has an insulating property and elasticity. As shown in FIGS. 2 and 3, the protection member 60 includes a cylindrical part 61 and a protection wall 62 protruding from an edge of the outer periphery of the cylindrical part 61.

As shown in FIGS. 2 and 3, the outer periphery of the cylindrical part 61 is formed in a stepped shape, and the portion thereof with a reduced diameter serves as a held part 63 which is held in the through hole 33. Since the held part 63 has a reduced diameter, as shown in FIG. 4, the cylindrical part 61 is provided with a contact face 64 that comes into contact with the flat rim part of the through hole 33. Further, the end of the cylindrical part 61 opposite to the held part 63 in the axial direction has a slightly larger diameter, so that a waterproof cap 73 described later can be engaged with it. The upper surface of the cylindrical part 61 is flat and is larger than a round terminal 71 described later. The dimension of the cylindrical part 61 in the axial direction is set such that the upper end of the battery terminal 50 (the upper ends of the connection part 53 and the pedestal nut 52) can be exposed. Further, as shown in FIG. 3, the cylindrical part 61 is provided with a through hole 65 having the same diameter over the entire length of the cylindrical part 61 in the axial direction.

The held part 63 is formed in a cylindrical shape having a part with a flat face so as to regulate the assembling direction, and it is thinner than the rest of the cylindrical part 61, in other words, it has a reduced outer diameter. Further, the dimension of the held part 63 in the axial direction is the same as the dimension of the through hole 33 in the axial direction, and the outer diameter of the held part 63 is the same as the inner diameter of the through hole 33.

A part of the protection wall 62 is cut out so that components such as the round terminal 71 can enter the region surrounded by the protection wall 62 and the cylindrical part 61. The dimension of the protection wall 62 in the axial direction is set such that the battery terminal 50 is not exposed, and the protection wall 62 prevents the connection part 53 from contacting the surrounding components.

As shown in FIGS. 2 and 4, the battery cable 70 includes a round terminal 71, which is an example of the cable terminal, a covered electric wire 72, and a waterproof cap 73. The round terminal 71 is crimped to an end of the covered electric wire 72. The round terminal 71 is inserted into the connection part 53 of the battery terminal 50 and is fastened with a nut 74. Instead of the round terminal 71, a terminal of another shape such as a U terminal may be used.

In addition, the waterproof cap 73 is provided at the end of the covered electric wire 72 so as to cover the connection part 53 between the battery cable 70 and the battery terminal 50. The waterproof cap 73 is formed of a thin, easily deformable material. The waterproof cap 73 is configured so as to come into close contact with the cylindrical peripheral surface of the protection wall 62 and is engaged with the end of the cylindrical part 61 on the protection wall 62 side. The waterproof cap 73 covers the connection part 53 so that it is not directly exposed to water from the outside.

Next, the pedestal nut 52 and its peripheral structure will be explained. FIGS. 3 and 4 show the peripheral structure of the battery terminal 50 during and after assembly of the protection member 60.

The pedestal nut 52 of the battery terminal 50 has a fastening face for engagement with the round terminal 71 of the battery cable 70, and also the pedestal nut 52 is a member for fixing the stud bolt 51 to the rectifier 40 as described above. The pedestal nut 52 is formed by integrally forming a hexagonal nut part 52A and a pedestal part 52B. The pedestal part 52B has a truncated conical shape, and is provided with a screw hole communicating with the hexagonal nut part 52A into which the stud bolt 51 can be screwed. By screwing the stud bolt 51 into the screw hole of the hexagonal nut part 52A and the pedestal part 52B, the pedestal nut 52 comes into close contact with the outer peripheral surface of the stud bolt 51.

The outer peripheral surface of the pedestal part 52B is a tapered face 54. Forming the tapered face 54 on the pedestal part 52B of the pedestal nut 52 is easier than forming a tapered face on an integrated component of the pedestal nut and the stud bolt 51. The tapered face 54 includes an enlarged diameter part 55 having the maximum outer diameter on the base side of the battery terminal 50, and the diameter gradually decreases toward the tip side of the battery terminal 50. The tapered face 54 is provided over the entire length of the pedestal part 52B in the axial direction, so that it is provided over the entire length of the face of the pedestal nut 52 that faces the through hole 65. Since the tapered face 54 is provided over the entire length of the face of the pedestal nut 52 that faces the through hole 65, a large gap S is formed between the tapered face 54 and the inner peripheral surface of the through hole 65. The maximum outer diameter R1 of the pedestal part 52B (the outer diameter of the enlarged diameter part 55) is the same as the width across flats of the hexagonal nut part 52A, and is larger than the inner diameter R2 of the through hole 65. On the other hand, the minimum outer diameter R3 of the pedestal part 52B (the outer diameter of the end part on the connection part 53 side) is smaller than the inner diameter R2 of the through hole 65.

The rear cover 30 is assembled to the rectifier 40 such that the battery terminal 50 protruding from the rectifier 40 is inserted into the through hole 33. Then, the protection member 60 is assembled to the rear cover 30. The battery terminal 50 is inserted into the through hole 65 from the held part 63 side of the protection member 60. At the beginning of insertion, since the minimum outer diameter R3 of the pedestal part 52B is smaller than the inner diameter R2 of the through hole 65, it can be easily inserted.

Further, in a later stage of the assembling of the protection member 60, the held part 63 is inserted into the through hole 33. Once the held part 63 is inserted into the through hole 33, the held part 63 is held by the inner peripheral surface of the through hole 33. When the protection member 60 is pushed in further from this state, the outer diameter of the pedestal part 52B exceeds the inner diameter R2 of the through hole 65, and the held part 63 is pushed in along the tapered face 54. Then, when the contact face 64 is in contact with the rim part of the through hole 33, and the protection member 60 is positioned with respect to the rear cover 30, the enlarged diameter part 55 is pressed against the inner peripheral surface of the through hole 65. Further, even if the held part 63 is pressed against the tapered face 54 and tries to spread, the held part 63 would be restricted by the inner peripheral surface of the through hole 33. That is, since the base side of the held part 63 is sandwiched between the enlarged diameter part 55 and the inner peripheral surface of the through hole 33, it is possible to prevent water intrusion from the rear cover 30 side to the connection part 53 side. At this time, since the protection member 60 is formed of a material including an elastomer, the base side of the held part 63 is elastically deformed by being compressed during sandwiching, so that it comes into close contact with the enlarged diameter part 55.

In addition, the enlarged diameter part 55 is provided on the base side of the battery terminal 50, that is, at a distance from the connection part 53. Therefore, even if water intrudes inside from the gap between the outer peripheral surface of the enlarged diameter part 55 and the through hole 65, the water is retained in the gap S formed between the tapered face 54 and the inner peripheral surface of the through hole 65. Thus, intrusion of water to the connection part 53 side can be prevented.

In addition, since the seal part can be formed at the same time in the process of attaching the protection member 60 to the battery terminal 50 as described above, there is an advantageous effect in the manufacturing process. Furthermore, although the held part 63 of the protection member 60 tries to bulge outward as it is pressed against the tapered face 54, the contact between the outer peripheral surface of the held part 63 and the inner peripheral surface of the through hole 33 restricts this outward deformation of the held part 63. Therefore, the sealing provided by the pressure contact is ensured.

As shown in FIG. 4, once the protection member 60 is assembled to the rear cover 30, the battery cable 70 is connected to the battery terminal 50. The round terminal 71 is inserted into the connection part 53 of the battery terminal 50, and then the nut 74 is tightened so that the round terminal 71 comes into contact with the end face of the pedestal nut 52 and the pedestal nut 52 has a fastening face with the round terminal 71. After the round terminal 71 is sandwiched between the pedestal nut 52 of the battery terminal 50 and the nut 74, it is electrically connected to the battery terminal 50. Then, the waterproof cap 73 attached to the end of the covered electric wire 72 so as to cover the connection part 53 is assembled to the protection member 60. The connection part 53 is thus made waterproof.

According to the embodiment described above, the following advantageous effects can be obtained.

Since the protection member 60 and the battery terminal 50 are pressed against each other at the conical tapered face 54 formed on the outer peripheral surface of the battery terminal 50, the tapered face 54 forms the seal part. In this case, it is possible to prevent water from intruding inside the waterproof cap 73 through the space among the inner peripheral surface of the through hole 65 of the protection member 60 and the outer peripheral surface of the battery terminal 50.

The protection member 60 can be pressed against the battery terminal 50 by attaching the protection member 60 to the battery terminal 50. Therefore, appropriate waterproof performance of the battery terminal 50 can be easily realized.

In the present embodiment, since the outer diameter R1 of the enlarged diameter part 55 (the largest part) of the tapered face 54 of the battery terminal 50 is larger than the inner diameter R2 of the through hole 65, when the battery terminal 50 is inserted into the through hole 65 of the protection member 60, a seal part can be suitably provided by the pressure contact between the tapered face 54 of the battery terminal 50 and the inner peripheral surface of the through hole 65. Further, since the gap S is formed between the section of the outer peripheral surface of the battery terminal 50 with a diameter smaller than that of the enlarged diameter part 55 due to the tapered face 54, and the inner peripheral surface of the through hole 65, water can be collected in the gap S and thus intrusion of water into the waterproof cap 73 can be prevented.

Further, in the case where the rear cover 30 and the protection member 60 are separate components as in the present embodiment, a gap tends to occur among the inner peripheral surface of the through hole 65 and the outer peripheral surface of the battery terminal 50 due to assembly tolerance. Therefore, it is suitable to employ a configuration in which the enlarged diameter part 55 is provided to prevent water intrusion as in the present embodiment. In addition, even if the held part 63 is pressed against the tapered face 54 of the battery terminal 50 and tries to spread, the held part 63 would be restricted by the inner peripheral surface of the through hole 33, whereby the seal part is ensured.

The pedestal nut 52 has a fastening face with the round terminal 71 of the battery cable 70, and it is a separate member from the stud bolt 51 for fixing the stud bolt 51 to the rectifier 40. Forming the tapered face 54 on the pedestal part 52B of the pedestal nut 52 facilitates shaping during manufacturing. In addition, since the tapered face 54 is provided over the entire length of the face of the pedestal nut 52 that faces the through hole 65, a large gap S is formed between the tapered face 54 and the inner peripheral surface of the through hole 65. Therefore, even if water enters from the space between the enlarged diameter part 55 and the inner peripheral surface of the through hole 65, the water would likely be contained inside the through hole 65, and the water would not reach the connection part 53.

Second Embodiment

Figure 5:
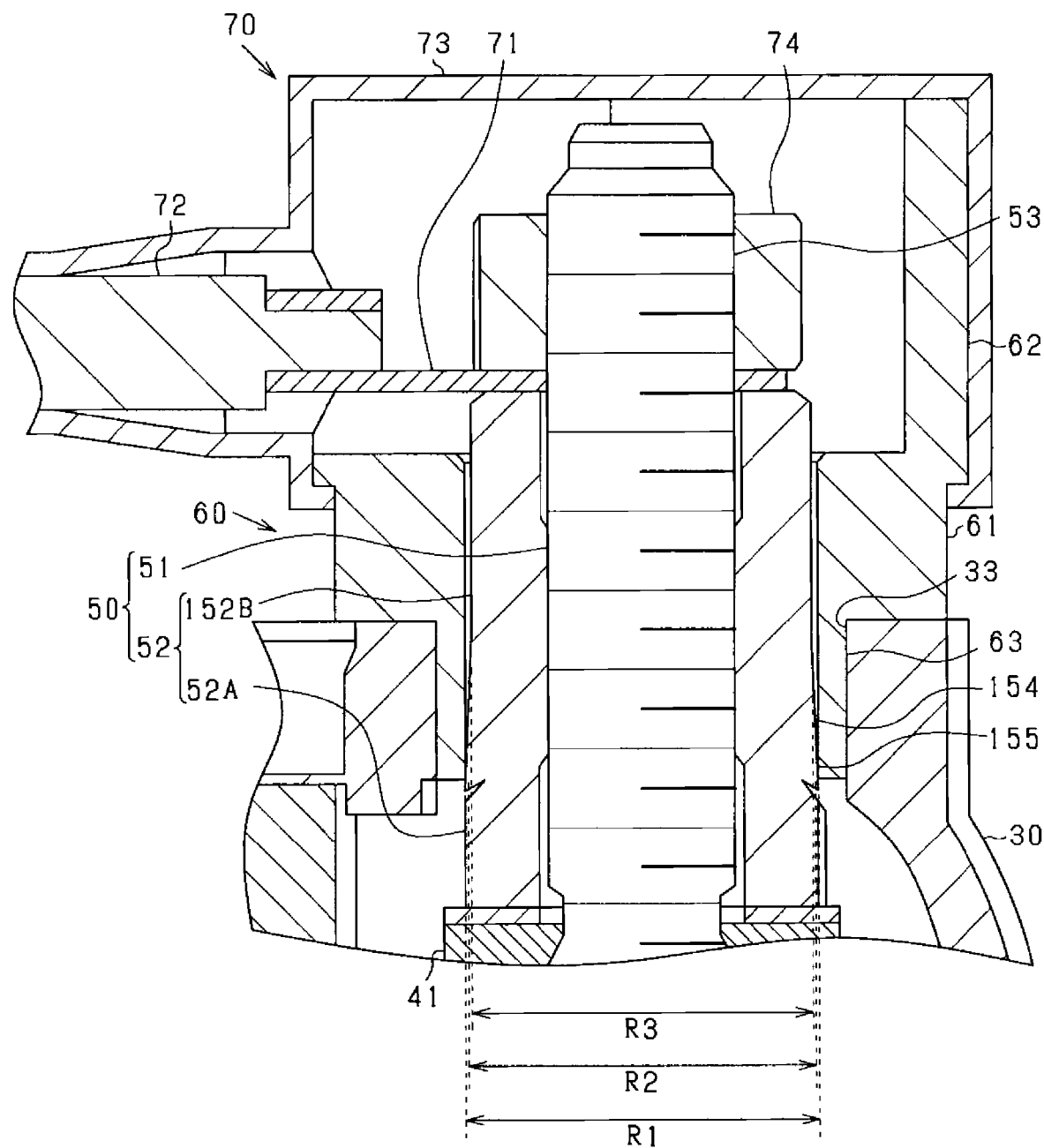
FIG. 5 is a sectional view after attaching the protection member according to a second embodiment.

In the first embodiment, the tapered face 54 is formed over the entire length of the pedestal part 52B of the pedestal nut 52. In this regard, in the second embodiment, as shown in FIG. 5, the tapered face 154 is formed only over a part of the pedestal part 152B.

The pedestal nut 52 of the battery terminal 50 is formed by integrally forming a hexagonal nut part 52A and a pedestal part 152B. The pedestal part 152B is provided with a screw hole communicating with the hexagonal nut part 52A into which the stud bolt 51 can be screwed.

The pedestal part 152B has a tapered face 154 formed on the outer peripheral surface of its base part. The tapered face 154 is provided on the base side of the pedestal part 152B over about one quarter of the entire length thereof in the axial direction, over a part of the face of the pedestal nut 52 that faces the through hole 65. The section of the pedestal part 152B where the tapered face 154 is not provided has a cylindrical shape with a constant diameter. The tapered face 154 has an enlarged diameter part 155 having the maximum outer diameter on the base side of the battery terminal 50. The maximum outer diameter R1 of the pedestal part 152B (the outer diameter of the enlarged diameter part 155) is the same as the width across flat surfaces of the hexagonal nut part 52A, and is larger than the inner diameter R2 of the through hole 65. On the other hand, the outer diameter R3 of the section of the pedestal part 152B having a constant diameter is smaller than the inner diameter R2 of the through hole 65.

The face of the pedestal nut 152 on the connection part 53 side is a fastening face with the round terminal 71 of the battery cable 70, and the pedestal nut is a separate member from the stud bolt 51 for fixing the stud bolt 51 to the rectifier 40. Forming the tapered face 154 on the pedestal part 152B of the pedestal nut 52 facilitates shaping during manufacturing. Further, since the tapered face 154 is provided over a part of the face that faces the through hole 65, as compared with the case where it is provided over the entire length, if the diameter on the base side is the same, the diameter of the pedestal part 152B needs not be reduced on the battery cable 70 side, and thus the contact area with the round terminal 71 of the battery cable 70 can be increased.

Third Embodiment

In the first and second embodiments, the tapered faces 54 and 154 are provided on the battery terminal 50 side. In this regard, in the third embodiment, as shown in FIGS. 6 and 7, the inner peripheral surface of the through hole 65 of the protection member 60 is a tapered face 266.

The battery terminal 50 includes a stud bolt 51 which is a rod-like part, and a pedestal nut 52 which is a cylindrical part in close contact with the outer peripheral surface of the stud bolt 51. The pedestal nut 52 of the battery terminal 50 is formed by integrally forming a hexagonal nut part 52A and a pedestal part 252B. The pedestal part 252B has a cylindrical shape with a constant diameter, and is provided with a screw hole communicating with the hexagonal nut part 52A into which the stud bolt 51 can be screwed. By screwing the stud bolt 51 into the screw hole of the hexagonal nut part 52A and the pedestal part 252B, the pedestal nut 52 comes into close contact with the outer peripheral surface of the stud bolt 51.

Figure 6:
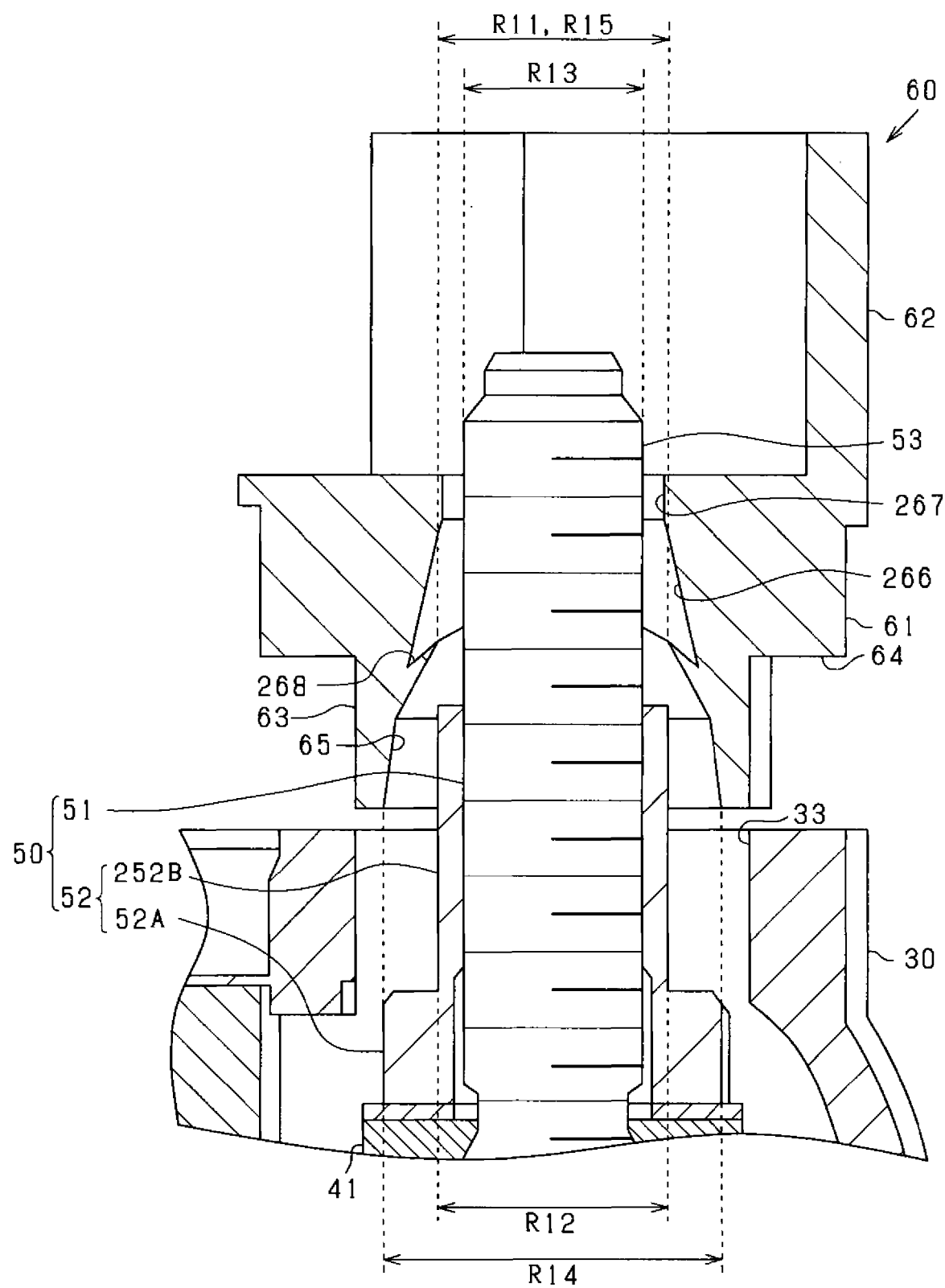
FIG. 6 is a sectional view during attachment of the protection member according to a third embodiment.
Figure 7:
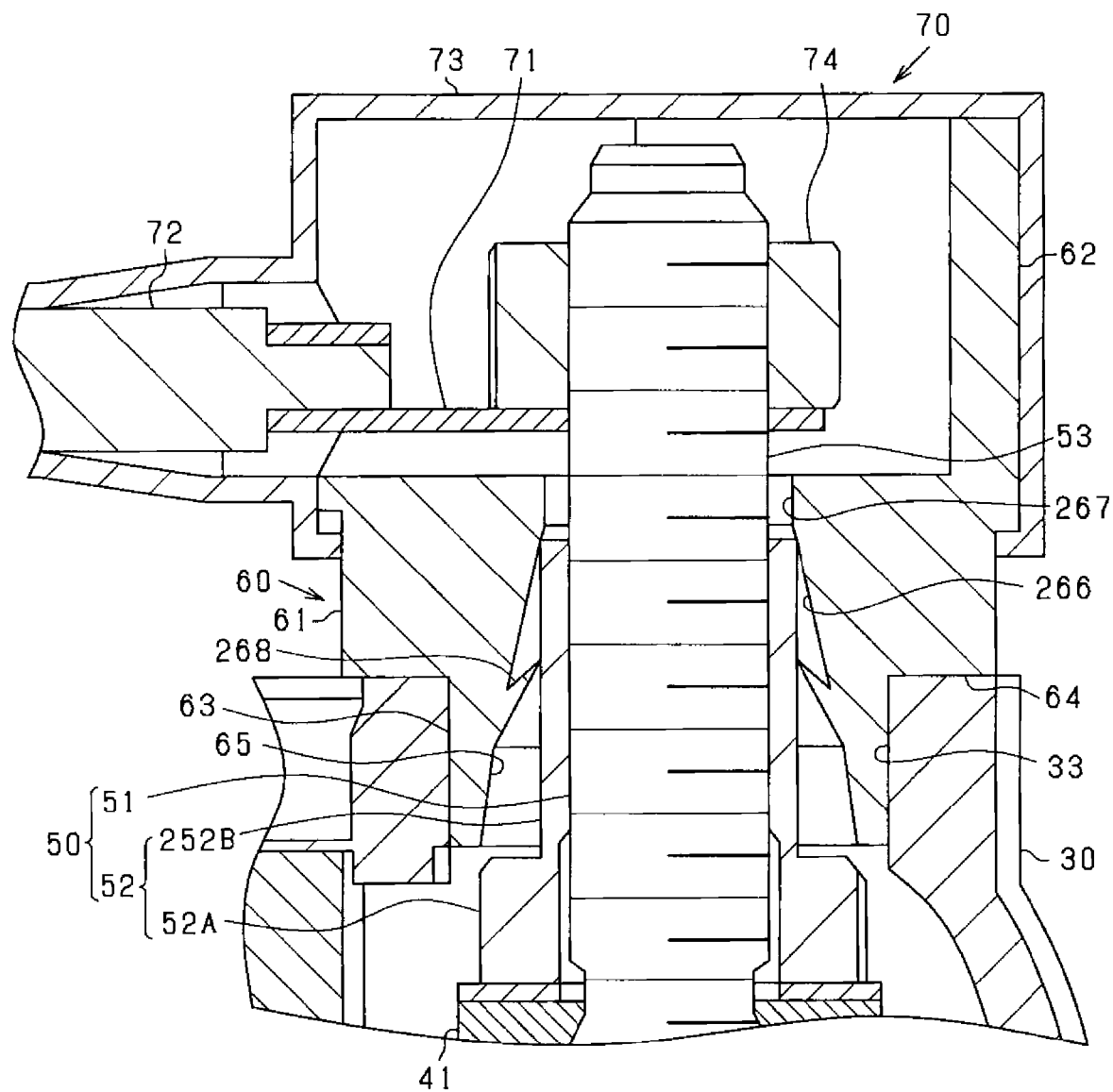
FIG. 7 is a sectional view after attaching the protection member according to the third embodiment.

As shown in FIGS. 6 and 7, the cylindrical part 61 of the protection member 60 is provided with a through hole 65 extending along the entire length in the axial direction. The inner peripheral surface of the through hole 65 is the tapered face 266. The tapered face 266 includes a reduced diameter part 267 having the minimum outer diameter on the connection part 53 side of the battery terminal 50, and the reduced diameter part 267 has a certain dimension in the axial direction. The diameter of the tapered face 266 increases toward the base side of the battery terminal 50. The tapered face 266 is provided over the entire length of the through hole 65 in the axial direction. The inner diameter R11 of the reduced diameter part 267 of the through hole 65 is smaller than the outer diameter R12 of the pedestal part 252B and larger than the outer diameter R13 of the stud bolt 51. On the other hand, the maximum inner diameter R14 of the through hole 65 (the outer diameter on the base side) is larger than the outer diameter R12 of the pedestal part 252B.

An annular protruding part 268 protruding inward from the inner peripheral surface of the through hole 65. The protruding part 268 and the reduced diameter part 267 provided in the through hole 65 are positioned with a separation therebetween in the axial direction. The protruding part 268 becomes thinner toward the tip (inner side), and the sectional shape of the protruding part 268 is triangular. The face of the protruding part 268 on the side that comes into contact with the battery terminal 50 is an inclined face that is inclined such that, the closer to the tip of the protruding part, the more it is pointed toward the tip of the battery terminal 50. The inner diameter R15 of the protruding part 268 is the same as the inner diameter of the reduced diameter part 267 and smaller than the outer diameter R12 of the pedestal part 252B, so that the protruding part 268 is elastically deformed and comes into close contact with the outer peripheral surface of the pedestal part 252B. Note that a plurality of protruding parts 268 may be arranged in the axial direction. The protruding part 268 may have another shape such as a flat plate-like shape.

The rear cover 30 is assembled to the rectifier 40 such that the battery terminal 50 protruding from the rectifier 40 is inserted into the through hole 33. Then, the protection member 60 is assembled to the rear cover 30. The battery terminal 50 is inserted into the through hole 65 from the held part 63 side of the protection member 60. At the beginning of insertion, since the maximum inner diameter R14 of the through hole 65 and the inner diameter R15 of the protruding part 268 are larger than the outer diameter R13 of the stud bolt 51, the insertion can be performed easily.

When the protection member 60 is assembled in the assembling direction, the protruding part 268 comes into contact with the pedestal part 252B of the battery terminal 50. Since the face of the protruding part 268 that comes into contact with the pedestal part 252B is a tapered inclined face, the tip of the protruding part 268 is easily elastically deformed along the outer peripheral surface of the battery terminal 50.

Further, in a later stage of the assembling of the protection member 60, the held part 63 is inserted into the through hole 33. Once the held part 63 is inserted into the through hole 33, the held part 63 is held by the inner peripheral surface of the through hole 33, and it cannot expand in the outer diameter direction. This makes the protruding part 268 come into close contact with the outer peripheral surface of the battery terminal 50. When the protection member 60 is pushed in further from this state, the tapered face 266 is in contact with the pedestal part 252B, and the reduced diameter part 267 is pressed against the connection part 53 side of the pedestal part 252B. Then, when the contact face 64 is in contact with the rim part of the through hole 33, and the protection member 60 is positioned with respect to the rear cover 30, the reduced diameter part 267 is pressed against the outer peripheral surface of the battery terminal 50. Since the reduced diameter part 267 comes into close contact with the outer peripheral surface of the battery terminal 50 so as to cover it, a seal part is formed and water intrusion is prevented.

Further, the protruding part 268 forms a seal part by closely contacting with the outer peripheral surface of the battery terminal 50. That is, sealing can be secured at two locations separated in the axial direction of the through hole 65. Even if water intrudes inside, it is possible to retain the water in the space between the protruding part 268 and the reduced diameter part 267 and prevent intrusion of water to the connection part 53 side. Further, the waterproof cap 73, attached to the end of the covered electric wire 72 so as to cover the connection part 53, is assembled to the protection member 60 to make the connection part 53 waterproof.

Since the inner diameter R11 of the reduced diameter part 267 (the smallest part) of the tapered face 266 on the inner peripheral surface of the through hole 65 is smaller than the outer diameter R12 of the battery terminal 50 (pedestal part 252B), a seal part can be advantageously formed by pressure contact between the reduced diameter part (the part with the minimum inner diameter) of the inner peripheral surface of the through hole 65 and the outer peripheral surface of the battery terminal 50. In addition, providing the tapered face 266 on the inner peripheral surface of the through hole 65 of the insulating member formed of, for example, a synthetic resin is easier than forming the tapered face on the battery terminal side formed of, for example, metal.

The sealing among the inner peripheral surface of the through hole 65 and the battery terminal 50 secured at at least two locations, that is, at the reduced diameter part 267 and the protruding part 268 further suppresses water intrusion into the waterproof cap 73. Since the reduced diameter part 267 and the protruding part 268 are located with a separation therebetween, water that has intruded from the gap between the protruding part 268 and the outer peripheral surface of the battery terminal 50 can be kept in the space between the reduced diameter part 267 and the protruding part 268, thereby preventing intrusion of water to the connection part 53 side.

In the case where the rear cover 30 and the protection member 60 are separate components, a gap tends to occur among the inner peripheral surface of the through hole 65 and the outer peripheral surface of the battery terminal 50 due to assembly tolerance. Therefore, it is suitable to employ the present configuration in which the reduced diameter part 267 and the protruding part 268 are provided to prevent intrusion of water.

In addition, since the protection member 60 is formed of a material containing an elastomer, it can be elastically deformed more easily when the inner peripheral surface (the reduced diameter part 267) of the through hole 65 or the protruding part 268 is pressed against the outer peripheral surface of the battery terminal 50.

Fourth Embodiment

Figure 8:
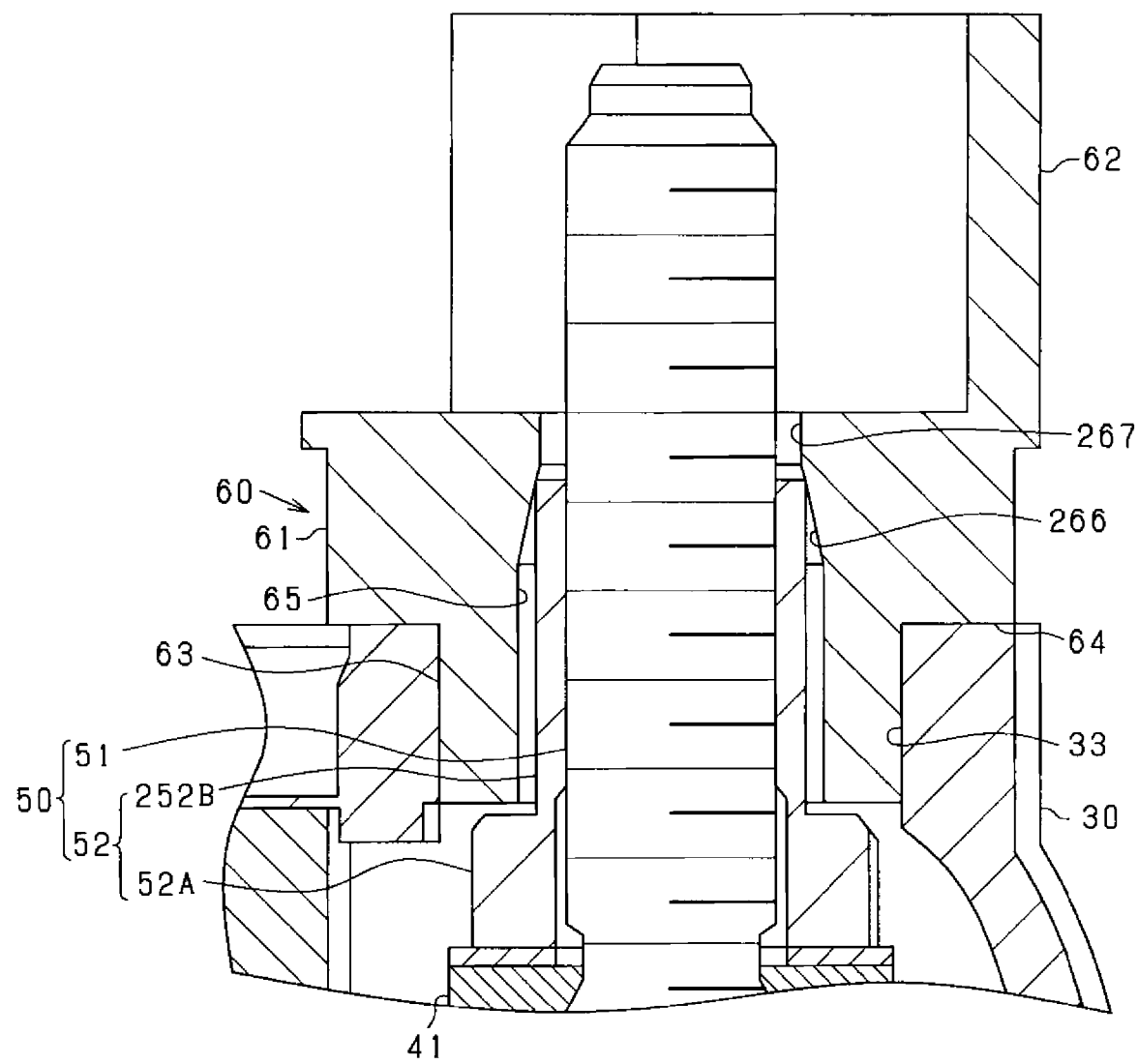
FIG. 8 is a sectional view after attaching the protection member according to a fourth embodiment.

In the third embodiment, the tapered face 266 is provided over the entire length of the through hole 65 in the axial direction, and also the protruding part 268 is provided. In this regard, in the fourth embodiment, as shown in FIG. 8, a tapered face 366 is provided over a part in the axial direction, and no protruding part is provided.

As shown in FIGS. 6 and 7, the cylindrical part 61 and the held part 63 of the protection member 60 are provided with the through hole 65. A part of the inner peripheral surface of the through hole 65 is the tapered face 366. The tapered face 366 is provided over about one third of the entire length of the through hole 65 in the axial direction on the connection part 53 side. The section of the through hole 65 where the tapered face 366 is not provided has a constant inner diameter. The tapered face 366 includes a reduced diameter part 267 having the minimum outer diameter on the connection part 53 side of the battery terminal 50, and the reduced diameter part 267 has a certain dimension in the axial direction. The inner diameter R11 of the reduced diameter part 267 of the through hole 65 is smaller than the outer diameter R12 of the pedestal part 252B and larger than the outer diameter R13 of the stud bolt 51. On the other hand, the maximum inner diameter R14 of the through hole 65 (the inner diameter of the section with a constant inner diameter) is larger than the outer diameter R12 of the pedestal part 252B.

Once the protection member 60 is assembled and placed in position, the reduced diameter part 267 comes into close contact with the end face of the pedestal part 252B on the connection part 53 side so as to cover it. The close contact between the reduced diameter part 267 and the outer peripheral surface of the battery terminal 50 forms a seal part which prevents intrusion of water.

Other Embodiments

The above-described embodiments may be modified, for example, as follows.
- Although the protection member 60 and the rear cover 30, which are insulating members, are separate components in the first to fourth embodiments, they may be formed integrally. When they are integrally formed, the contact becomes even tighter as the assembly error is reduced.
- Although the protruding part is not provided in the fourth embodiment, the protruding part may be provided.

Although the present disclosure is described based on examples, it should be understood that the present disclosure is not limited to the examples and structures. The present disclosure encompasses various modifications and variations within the scope of equivalence. In addition, the scope and the spirit of the present disclosure include other combinations and embodiments, only one component thereof, and other combinations and embodiments that are more than that or less than that.

What is claimed is:

1. A rotating electric machine for a vehicle comprising:
a rotor fixed to a rotation shaft;
a stator for generating an alternating current as the rotor rotates;
a frame member for holding the rotor and the stator;
a rectifier fixed to an outer side of the frame member and constituting a rectification circuit which rectifies the alternating current generated in the stator;
a battery terminal protruding from the rectifier and configured to be connected with a battery cable;
an insulating member having a through hole in which the battery terminal is inserted; and
a waterproof cap attached to the insulating member so as to cover a connection part of the battery terminal with the battery cable in a waterproof state, wherein:
an inner peripheral surface of the through hole of the insulating member has a conical tapered face, an outer diameter of a smallest part of the conical tapered face on the inner peripheral surface of the through hole being smaller than an outer diameter of the battery terminal, and the conical tapered face being provided over an entire length of the through hole in an axial direction;
the insulating member and the battery terminal are pressed against each other at the conical tapered face; and
an annular protruding part protruding inward is formed on the conical tapered face of the through hole, the annular protruding part being located closer to the rectifier than is the smallest part of the conical tapered face, and the annular protruding part becoming elastically deformed in response to the annular protruding part contacting with an outer peripheral surface of the battery terminal.

2. The rotating electric machine for a vehicle according to claim 1, wherein
the insulating member includes (i) a rear cover, which covers the rectifier and has a through hole into which the battery terminal is inserted, and (ii) a protection member assembled to the through hole of the rear cover and provided with the through hole, and
the protection member is provided with a held part held in the through hole of the rear cover.

3. The rotating electric machine for a vehicle according to claim 1, wherein
the battery terminal includes (i) a rod-like part, which is inserted through the rectifier and around which a cable terminal of the battery cable can be placed, and (ii) a cylindrical part in close contact with an outer peripheral surface of the rod-like part, and
the cylindrical part fixes the rod-like part to the rectifier and is contactable to the cable terminal.

4. The rotating electric machine for a vehicle according to claim 1, wherein
the smallest part of the conical tapered face and the annular protruding part are separated in the axial direction.

5. The rotating electric machine for a vehicle according to claim 1, wherein
the insulating member is formed of a material including an elastomer.

* * * * *